(12) United States Patent
Kanzaki et al.

(10) Patent No.: US 8,202,652 B2
(45) Date of Patent: Jun. 19, 2012

(54) SLURRY COMPOSITION FOR SECONDARY CELL POSITIVE ELECTRODE, SECONDARY CELL POSITIVE ELECTRODE AND SECONDARY CELL

(75) Inventors: Atsuhiro Kanzaki, Tokyo (JP); Takao Suzuki, Tokyo (JP); Katsuya Nakamura, Tokyo (JP)

(73) Assignee: Zeon Corporation, Tokyo (JP)

( * ) Notice: Subject to any disclaimer, the term of this patent is extended or adjusted under 35 U.S.C. 154(b) by 1214 days.

(21) Appl. No.: 10/416,025

(22) PCT Filed: Nov. 9, 2001

(86) PCT No.: PCT/JP01/09840
§ 371 (c)(1),
(2), (4) Date: May 13, 2003

(87) PCT Pub. No.: WO02/39518
PCT Pub. Date: May 16, 2002

(65) Prior Publication Data
US 2004/0020763 A1 Feb. 5, 2004

(30) Foreign Application Priority Data

Nov. 13, 2000 (JP) ................................. 2000-344742

(51) Int. Cl.
*H01M 4/13* (2010.01)
(52) U.S. Cl. ................... 429/231.95; 429/306; 429/309; 429/231.9; 429/249; 429/254

(58) Field of Classification Search ................... 429/217, 429/300, 309, 306, 231.9, 231.95, 249, 254
See application file for complete search history.

(56) References Cited

U.S. PATENT DOCUMENTS

| 6,379,846 | B1 * | 4/2002 | Terahara et al. | 429/344 |
| 6,436,573 | B1 * | 8/2002 | Goto et al. | 429/217 |
| 6,756,153 | B1 * | 6/2004 | Yamamoto et al. | 429/217 |

FOREIGN PATENT DOCUMENTS

| JP | 8-157677 | | 6/1996 | |
| JP | 11-250915 | | 9/1999 | |
| JP | 2000-285924 | | 10/2000 | |
| JP | 2000-294252 | | 10/2000 | |
| WO | WO 00/45452 | * | 8/2000 | .......... 429/217 |

* cited by examiner

*Primary Examiner* — Patrick Ryan
*Assistant Examiner* — Ben Lewis
(74) *Attorney, Agent, or Firm* — Kratz, Quintos & Hanson, LLP

(57) ABSTRACT

A slurry composition for a positive electrode for a lithium ion secondary battery, comprising a polymer A wherein a HOMO value by a semiempirical method molecular orbital calculation is −13.5 eV to −10 eV and a content of ethylene repeating units is 30 mol % to 95 mol %; a polymer B wherein a HOMO value by a semiempirical method molecular orbital calculation is −13.5 eV to −10 eV, a glass transition temperature is −80° C. to 0° C., and a gel content is 50 wt % or more; an active material for a positive electrode; a conductivity adding agent; and a liquid medium C in which the polymer A dissolves but the polymer B does not dissolve. According to the composition, a lithium ion secondary battery having a large battery capacity, a good charge/discharge cycle characteristic and an improved rate characteristic can be realized.

17 Claims, No Drawings

SLURRY COMPOSITION FOR SECONDARY CELL POSITIVE ELECTRODE, SECONDARY CELL POSITIVE ELECTRODE AND SECONDARY CELL

TECHNICAL FIELD

The present invention relates to a slurry composition for a positive electrode for a lithium ion secondary battery, a positive electrode for a lithium ion secondary battery produced by using the same, and a lithium ion secondary battery having the positive electrode.

BACKGROUND ART

In recent years, notebook-sized personal computers, cellular phones, PDAs (Personal Digital Assistant) and other portable terminals have been remarkably widespread. As batteries for the portable terminals, a lithium ion secondary battery (hereinafter, also simply referred to as a battery) is often used. Due to demands for more comfortable portability, the portable terminals have been rapidly made more compact, thinner, lighter, and higher in performance and become used in various occasions. This movement has been still continuing today and there are also demands for batteries to be more compact, thinner, lighter, and higher in performance.

A lithium ion secondary battery has a structure of containing in a container a positive electrode and a negative electrode arranged over a separator together with an electrolyte solution wherein lithium salt, such as $LiPF_6$ and $LiBF_4$, is dissolved in an organic liquid of ethylene carbonate or the like. The positive electrode of the secondary battery is obtained by mutually binding $LiCoO_2$, $LiMn_2O_4$, or the like as an active material and acetylene black, or the like as a conductive material by a secondary battery electrode binder (hereinafter, also simply referred to as a binder) and further binding the result to aluminum, etc. as a collector. The negative electrode of the secondary battery is obtained by mutually binding by a binder a carbonaceous material as an active material and the same conductive material as above, etc. in accordance with need, and further binding the result to a collector of copper, etc.

The positive and negative electrodes are usually formed by dissolving or dispersing a binder for an electrode in a liquid medium, applying an electrode slurry composition obtained by mixing the result with an active material, conductivity adding agent, etc. (hereinafter, also simply referred to as a slurry) to a collector, removing the liquid medium by drying, etc. and binding as a mixed layer.

Recently, there are stronger demands for a longer use time of portable terminals and a shorter charging time thereof, so attaining of a larger capacity and an improvement of charging speed (a rate characteristic) of batteries are urgent. A battery capacity is strongly affected by an amount of an active material and the rate characteristic is affected by easiness of electron movement. Suppression of a binder amount is effective for increasing an active material in a limited space of a battery, while it is limited because a binding property of the active material is deteriorated when the binder amount is reduced. Also, since the binder is a non-conductive polymer and is liable to hinder electron movement, there has been an attempt for improving the rate characteristic by adding a conductivity adding agent, such as carbon. However, adding of a conductivity adding agent results in limiting a use amount of an active material and an improvement of a battery capacity is hardly expected.

As explained above, attaining of a battery having a larger capacity has been thus far hard to consist with an improvement of the rate characteristic.

DISCLOSURE OF INVENTION

An object of the present invention is to provide a secondary battery wherein a large capacity of the battery and an improvement of the rate characteristic are attained based on a lithium ion secondary battery which is a secondary battery having a large battery capacity.

The present inventors found that a lithium ion secondary battery having a large battery capacity, a high charge/discharge cycle characteristic and an improved rate characteristic can be attained by adjusting stability of oxidization resistance, glass transition temperature and solubility to a liquid medium in a binder used for producing a positive electrode and completed the present invention based on the knowledge.

(1) Namely, according to the present invention, there is provided a slurry composition for a positive electrode for a lithium ion secondary battery, comprising:

a polymer A wherein a HOMO value by a semiempirical method molecular orbital calculation is −13.5 eV to −10 eV and a content of ethylene repeating units is 30 mol % to 95 mol %;

a polymer B wherein a HOMO value by a semiempirical method molecular orbital calculation is −13.5 eV to −10 eV, a glass transition temperature is −80° C. to 0° C., and a gel content is 50 wt % or more;

an active material for a positive electrode;

a conductivity adding agent; and a liquid medium C in which the polymer A dissolves but the polymer B does not dissolve.

(2) Also, according to the present invention, there is provided a positive electrode for a lithium ion secondary battery wherein a mixed layer is bound to a collector, wherein said mixed layer comprises a polymer A wherein a HOMO value by a semiempirical method molecular orbital calculation is −13.5 eV to −10 eV and a content of ethylene repeating units is 30 mol % to 95 mol %;

a polymer B wherein a HOMO value by a semiempirical method molecular orbital calculation is −13.5 eV to −10 eV, a glass transition temperature is −80° C. to 0° C., and a gel content is 50 wt % or more;

an active material for a positive electrode; and a conductivity adding agent.

(3) Furthermore, according to the present invention, there is provided a lithium ion secondary battery having a positive electrode as above.

When a secondary battery electrode slurry composition of the present invention is used, a positive electrode having an excellent binding property can be obtained, and a lithium ion secondary battery provided with the electrode has a large discharge capacity, good cycle characteristic and an excellent rate characteristic even under a high temperature condition.

BEST MODE FOR CARRYING OUT THE INVENTION

In a slurry composition for a positive electrode for a lithium ion secondary battery of the present invention, one dissolved in a liquid medium to a certain extent as a whole but not completely dissolved is used as a binder. It is because the binder has to be dissolved in a liquid medium to give preferable high viscosity as a slurry, on the other hand, the binder has to be applied to an active material and a collector while keeping a particle shape in the slurry so as not to cover up a surface of an active material to hinder battery reactions.

Thus, in the present invention, a polymer A, soluble in a liquid medium C of a slurry composition for a positive electrode and a polymer B, insoluble in the liquid medium C are both used as binders for the positive electrode.

The polymer A, which is a binder soluble in the liquid medium C, has a HOMO (Highest Occupied Molecular Orbital Energy) value of −13.5 to −10 eV by a semiempirical method molecular orbital calculation and a content of ethylene repeating units of 30 to 95 mol %.

The first characteristic of the polymer A is that the HOMO value is −13.5 to −10 eV, preferably −13.0 to −10.5 eV. The HOMO value is an index for judging an oxidization reducing property of a compound. The fact that the HOMO value of the polymer A is −13.5 to −10 eV means that the polymer A is hard to be taken electrons and hard to be oxidized. Accordingly, durability can be given as a binder at the positive electrode. When the HOMO value is too large, the oxidization resistance property declines and the rate characteristic is liable to be deteriorated, while when the HOMO value is too small, a binding property is liable to be deteriorated.

The HOMO value of a polymer is a calculation value of a highest occupied molecular orbital energy by a semiempirical method of a compound, which can be obtained by a computer program "MOPAC93" (made by the Fujitsu Co. Ltd.) on the market by calculating in the AM1 method (refer to the Journal of American Chemical Society, vol.107, page 3902, 1985, by M. J. S. Dewar et. al.)

The polymer A has a glass transition temperature (Tg) of preferably −80 to 0° C., more preferably −60 to −5° C., particularly preferably −40 to −10° C. When the Tg is too high, a mixed layer formed by the polymer A and an active material, etc. becomes inflexible, so a crack arises in the mixed layer when repeating charging and discharging of the battery, and an active material is liable to fall off from a collector. On the other hand, when the Tg is too low, there is a possibility that the battery capacity reduces.

To give a Tg in the above range to the polymer A, the polymer A needs to be a homopolymer of a monomer, by which the Tg of the homopolymer becomes 0° C. or less, or a copolymer of a mixed monomer including such a monomer by a substantial ratio.

As examples of a monomer by which the Tg of the homopolymer becomes 0° C. or less, acrylic esters such as ethyl acrylate (Tg of the homopolymer becomes −22° C.), n-propyl acrylate (−52° C.), butyl acrylate (−54° C.), isobutyl acrylate (−24° C.), n-octyl acrylate (−65° C.), 2-ethylhexyl acrylate (−85° C.), methoxyethyl acrylate (−85° C.), ethoxyethyl acrylate (−50° C.); methacrylic esters such as n-octyl methacrylate (−20° C.), n-decyl methacrylate (−65° C.), n-lauryl methacrylate (−65° C.); conjugated dienes such as 1,3-butadiene, 2-methyl-1, 3-butadiene (isoprene), 2,3-dimethyl-1,3-butadiene, 1,3-pentadiene, 1,3-hexadiene; may be mentioned.

A second characteristic of the polymer A is that a content of ethylene units in repeating units composing the polymer exists 30 to 95 mol %, preferably 35 to 90 mol %, more preferably 40 to 85 mol %. When the content of ethylene units is excessively small, solution of polymer A is liable to be no longer thixotropic and unable to make the electrode slurry paint-form, while when excessively large, there is a possibility that polymer A becomes insoluble in the liquid medium C of an electrode slurry composition.

The polymer A may be what polymerized by using ethylene as a part of a raw monomer so that the content of ethylene units becomes the above range, or what obtained by hydrogenating a polymer obtained by using a monomer of conjugate dienes such as butadiene as a part of the raw monomer so as to have the content of ethylene units in the above range. In the case of the latter method, a ratio of unsaturated bond is preferably small for not declining the oxidization resistance property, so a iodine value is preferably 15 or less.

As far as the polymer A has the above characteristics and a property of being soluble in the liquid medium C, repeating units other than the ethylene units are not limited. To give the polymer A repeating units other than the ethylene units, usually, a monomer capable of copolymerizing is selected in terms of the HOMO value, Tg and ethylene units and copolymerized.

As the above copolymerizable monomer, other than the monomer which gives a homopolymer having a low Tg as the above example, unsaturated nitrile compounds such as acrylonitrile, methacrylonitrile; α-olefin monomers such as propylene, 1-butene, 1-pentene, isobutene, 3-methyl-1-butene; may be mentioned. The polymer A may be a block polymer or a random polymer.

As examples of the polymer A having the above characteristics, hydrogenation product of acrylonitrile-butadiene rubber, ethylene-methyl acrylate copolymer, or the like may be mentioned.

In the present invention, the polymer B, which is a binder insoluble in the liquid medium C, needs to have characteristics that the HOMO value is −13.5 to −10 eV and the Tg is −80 to 0° C., moreover, needs to contain gel so as to be polymer particles hard to be dissolved in the liquid medium C or an electrolyte solution.

A measurement method of a gel content (hereinafter, referred to as G1) is as described below. First, 0.2 g of polymer is soaked in 20 milliliters of tetrahydrofuran (referred to as THF) at 60° C. for 72 hours, then the result is filtered by a sieve of 80 mesh. Next, a product on the sieve is dried and weighed. The G1 is obtained by expressing the obtained weight by a percentage based on a weight (0.2 g) of the polymer before soaking. The G1 of the polymer B is 50 to 100 wt %, preferably 60 to 100 wt %, more preferably 70 to 100 wt %. When the G1 is excessively small, binding durability of the battery is liable to decline.

Also, the polymer B is required not to be dissolved in the liquid medium C of a slurry composition for a positive electrode but it may swell. A swelling degree of the polymer B by the liquid medium C is preferably not more than 30 times, more preferably not more than 15 times. When the swelling degree of the polymer B is too large, the charge/discharge cycle characteristic at a high temperature and a low temperature is liable to decline. When the swelling degree of the polymer B is in the above range, it is preferable because the preservation property of a battery capacity also becomes preferable. The swelling degree is a value obtained by dividing a weight after soaking in the liquid medium C a cast film obtained by casting and drying a dispersion system wherein the polymer B is dispersed in the liquid medium C for 24 hours by a weight before the soaking.

When the polymer B is dispersed as particles in the liquid medium C, the fact that the particles exist without being dissolved can be easily confirmed by a transmission electron microscope or an optical microscope, etc.

To give the polymer B having a gel content in the above range, it is preferable to polymerize by using a monomer mixture containing a multifunctional ethylenically unsaturated monomer to form a cross-linked polymer. As to an amount of the multifunctional ethylenically unsaturated monomer, the ratio based on all monomer use amount for obtaining the polymer B is preferably 0.3 to 5 wt %, more preferably 0.5 to 3 wt %.

As examples of the multifunctional ethylenically unsaturated monomer, divinyl compounds such as divinylbenzene; dimethacrylic esters such as diethylen glycol dimethacrylate, ethylene glycol dimethacrylate; trimethacrylic esters such as trimethylol propane trimethacrylate; diacrylic esters such as polyethylene glycol diacrylate, 1,3-butylene glycol diacrylate; triacrylic esters such as trimethylol propane triacrylate; dienes such as butadiene, isoprene; may be mentioned.

As examples of the polymer B having the above characteristics, acrylic rubbers such as 2-ethylhexyl acrylate -methacrylic acid -acrylonitrile -ethylene glycol dimethacrylate copolymer, butyl acrylate-acrylic acid-trimethylol propane trimethacrylate copolymer; acrylonitrile-butadiene rubber, or the like may be mentioned.

The polymer A and the polymer B used in the present invention can be produced by known polymerization methods such as an emulsion polymerization method, suspension polymerization method, dispersion polymerization method. Furthermore, the polymer A may be produced by solution polymerization. The polymer B may be produced by a seed polymerization method, wherein polymer particles having smaller particle diameter are used as seeds and polymerized by covering.

A particle diameter of the polymer B is usually 0.005 to 1000 μm, preferably 0.01 to 100 μm, more preferably 0.05 to 10 μm. When the particle diameter is too large, an amount required as a binder becomes too much and internal resistance of electrodes increases. Inversely, when the particle diameter is too small, the surface of an active material is covered up and battery reactions are hindered.

Here, the particle diameter is an average particle diameter obtained by measuring diameters of 100 polymer particles randomly selected in a picture taken by a transmission electron microscope and calculating an average value thereof.

An emulsifier and a dispersant used in producing the polymer A and the polymer B may be those used in the ordinary methods such as emulsion polymerization method, suspension polymerization method, dispersion polymerization method, etc., specifically, alkyl aryl sulfonates such as sodium dodecylbenzene sulfate, sodium dodecyl phenylether sulfonate; alkyl sulfates such as sodium lauryl sulfate, sodium tetradodecyl sulfate; sodium sulfosuccinate such as sodium dioctyl sulfosuccinate, sodium dihexyl sulfosuccinate; fatty acid salts such as sodium laurate; alkoxy sulfate salts such as sodium polyoxyethylene laurylether sulfate, sodium polyoxyethylene nonylphenylether sulfate; alkyl sulfonates such as sodium lauryl sulfonate; alkylether phosphoric ester and its sodium salt; nonionic emulsifier such as polyoxyethylene nonylphenylether, polyoxyethylene sorbitan lauryl ester, polyoxyethylene-polyoxypropylene block copolymer; gelatin, maleic unhydride-stylene copolymer, polyvinyl pyrrolidone, sodium polyacrylate, polyvinyl alcohol having a polymerization degree of 700 or more and a saponification degree of 75% or more, and other water-soluble polymers may be mentioned, which can be used alone or in combination of two kinds or more. The amount of the emulsifier and the dispersant maybe freely chosen and is usually 0.01 to 10 parts by weight based on 100 parts by weight of the total amount of the monomer in the polymer A and polymer B.

A polymerization initiator may be those used in the ordinary emulsion polymerization method, dispersion polymerization method, suspension polymerization method, etc. and there are, for example, persulfates such as potassium persulfate, ammonium persulfate; hydrogen peroxide; organic peroxides such as lauroyl peroxide, benzoil peroxide, di-2-ethylhexyl peroxidicarbonate, t-butyl peroxypivalate, cumene hydro peroxide; may be mentioned. The polymerization initiator can be used alone or in combination of two kinds or more, or furthermore, used as a redox system, wherein a reducing agent, such as acid sodium sulfite, sodium subsulfite, ascorbic acid, is used therewith. Also, azo compounds such as 2, 2'-azobisisobutyronitrile, 2,2'-azobis(2, 4-dimethylvaleronitrile), 2,2'-azobis(4-methoxy-2, 4-dimethylvaleronitrile), dimethyl 2, 2'-azobisisobutylate, 4,4'-azobis(4-cyanopentanoic acid); amidine compounds such as 2, 2'-azobis (2-aminodipropane) dihydrochloride, 2, 2'-azobis(N,N'-dimethylene isobutyl amidine), 2, 2'-azobis(N,N'-dimethylene isobutyl amidine) dihydrochloride; may be used. The amount of the polymerization initiator is 0.01 to 10 parts by weight, preferably 0.1 to 5 parts by weight based on 100 parts by weight of the total monomer both in the polymer A and polymer B.

In polymerization of the polymer A and polymer B, additives, such as a molecular weight adjuster, can be used. As the molecular weight adjuster, for example, mercaptans such as t-dodecylmercaptan, 2-mercaptoethanol; halogenated hydrocarbons such as carbon tetrachloride; may be mentioned. The molecular weight adjusters may be added before starting or during the polymerization.

A polymerization temperature and a polymerization time of the polymer A and polymer B may be freely selected based on a polymerization method and a kind of a polymerization initiator etc., but usually about 50 to 200° C. for 0.5 to 20 hours or so. Furthermore, at the time of polymerizing, a well-known auxiliary, such as amines, can be used together to heighten stability of polymer particles of water dispersion.

In the present invention, the ratio of the polymer A and the polymer B is, in the weight ratio of A/B, preferably 1/10 to 10/1, more preferably 1/5 to 5/1, particularly preferably 1/3 to 3/1. By using the polymer A and the polymer B together at this ratio, a battery having an excellent charge/discharge cycle characteristic at a high temperature can be obtained.

Also, as far as the effects of the present invention is not disturbed, other polymers, such as polyvinylidene fluoride and polytetrafluoroethylene, may be used in a range of not more than 50wt % of a total of the polymer A and the polymer B.

A slurry composition for a positive electrode of the present invention is obtained by dissolving or dispersing the above binder in the liquid medium C and adding thereto an active material for a positive electrode, a conductivity adding agent, etc.

The amount of the above binder in the composition of the present invention is usually 0.1 to 4 parts by weight, preferably 0.3 to 3 parts by weight, particularly preferably 0.5 to 2.5 parts by weight based on 100 parts by weight of an active material for a positive electrode. When the amount of the binder is excessively small, the active material is liable to fall off from a collector, while when excessively large, there is a possibility that the binder covers up the active material to hinder battery reactions.

As an active material for a positive electrode to be blended in the positive electrode slurry composition, $TiS_2$, $TiS_3$, amorphous $MoS_3$, transition metal oxides such as $Cu_2V_2O_3$, amorphous $V_2O$—$P_2O_5$, $MoO_3$, $V_2O_5$, $V_6O_{13}$; lithium containing composite metal oxides such as $LiCoO_2$, $LiNiO_2$, $LiMnO_2$, $LiMn_2O_4$; are used.

As a conductivity adding agent to be blended in the positive electrode slurry composition, metal powder, conductive polymer, acetylene black, ketjen black, graphite, etc, may be mentioned. The amount of the conductivity adding agent is usually 1 to 10 parts by weight, preferably 2 to 7 parts by weight per 100 parts by weight of an active material for a positive electrode.

The liquid medium C used for the positive electrode slurry composition of the present invention is not particularly limited as far as it is a liquid in which the polymer A dissolves but the polymer B does not dissolve, but those having a boiling point under an atmospheric pressure of preferably 80° C. or more and 350° C. or less, more preferably 100° C. or more and 300° C. or less.

An example of the liquid medium C and a boiling point thereof will be explained. Here, a numeral in ( ) after a material name indicates a boiling point (unit is ° C.) under an atmospheric pressure, wherein decimals are rounded off or omitted.

Water (100); aliphatic hydrocarbons such as n-dodecane (216); aromatic hydrocarbons such as tetralin (207); alcohols such as 2-ethyl-1-hexanol (184), 1-nonanol (214); ketones such as phorone (197), acetophenone (202), isophorone (215); esters such as benzyl acetate (21 3), isopentyl acetate (184), γ-butyrolactone (204), methyl lactate (143), ethyl lactate (154), butyl lactate (185); amines such as o-toluidine (200), m-toluidine (204), p-toluidine (201); amides such as N-methyl pyrrolidone (204), N,N-dimethyl acetamide (194), dimethyl formamide (153); sulfoxide sulfones such as dimethyl sulfoxide (189), sulfolane (287); etc. may be mentioned. Among them, N-methyl pyrrolidone is particularly preferable in terms of practical use.

In the above slurry composition for a positive electrode a viscosity adjuster, fluidizer, etc. may be added in accordance with need.

The positive electrode of the present invention is formed by applying the above-mentioned slurry composition to a collector and removing the liquid medium C by means of drying, etc. so as to be bound as a mixed layer.

The collector is not particularly limited as far as it is composed of a conductive material, but the effect of a binder of the present invention is exhibited most when using aluminum. A shape thereof is not particularly limited, either, but usually a sheet having a thickness of 0.001 to 0.5 mm or so is preferable.

A method of applying the positive electrode slurry composition to the collector is not particularly limited. For example, a doctor blade method, dip method, reverse roll method, direct roll method, gravure method, extrusion method, brushing method, etc. may be mentioned. The amount of applying is not particularly limited, but a general amount is to give a thickness of 0.005 to 5 mm, preferably 0.01 to 2 mm to a mixed layer of an active material, conductivity adding agent and the binder formed after removing the solvent or dispersion medium by means of drying, etc.

The drying method of the liquid solution C is not particularly limited and, for example, ventilation methods by a warm air, hot air and low humidity air; vacuum drying; radiation drying by an infrared ray, far-infrared ray, electron ray, etc. may be mentioned. Drying conditions are preferably adjusted so that the liquid medium C is removed as quick as possible but in a speed range to an extent that a crack caused by a stress concentration does not appear in the active material layer and that the active material layer is not fallen off from the collector.

Furthermore, to heighten the density of the active material of the electrodes, it is effective to press the electrodes after drying. As the pressing method, metal mold pressing and roll pressing, etc. may be mentioned.

In the present invention, a negative electrode may be used those usually used in lithium ion secondary battery. For example, as an active material for a negative electrode, carbonaceous material which is able to be doped and undoped with lithium ion, is used. The negative electrode is formed by applying a slurry composition for a negative electrode produced by mixing an active material for a negative electrode, a binder such as acrylonitrile-butadiene rubber, stylene-butadiene rubber and acrylic rubber, another binder such as hydroxyethyl cellulose, carboxymethyl cellulose and poly (vinylidene fluoride), and, if necessary, a conductivity adding agent to the collector and drying the liquid medium.

A lithium ion secondary battery of the present invention has a structure of containing in a container the above-mentioned positive electrode and negative electrode over a separator together with an electrolyte solution where in an electrolyte is dissolved in a solvent.

The electrolyte solution may be a liquid or gel as far as it is usually used lithium ion secondary batteries and may be selected from those which exhibit a function as a battery in accordance with a kind of an active material for a positive electrode and an active material for a negative electrode.

As the electrolyte, for example, any of conventionally known lithium salts can be used and $LiClO_4$, $LiBF_4$, $LiPF_6$, $LiCF_3SO_3$, $LiCF_3CO_2$, $LiAsF_6$, $LiSbF_6$, $LiB_{10}Cl_{10}$, $LiAlCl_4$, $LiCl$, $LiBr$, $LiB(C_6H_5)_4$, $CF_3SO_3Li$, $CH_3SO_3Li$, $LiC_4F_9SO_3$, $Li(CF_3SO_2)_2N$, lithium salts of lower fatty acid, etc. may be mentioned.

The solvent for dissolving the electrolyte (solvent for electrolyte solution) is not particularly limited. As specific examples, carbonates such as propylene carbonate, ethylene carbonate, butylene carbonate, dimethyl carbonate, diethyl carbonate, ethylmethyl carbonate; lactones such as γ-butyl lactone; ethers such as trimethoxymethane, 1,2-dimethoxyethane, diethyl ether, 2-ethoxyethane, tetrahydrofuran, 2-methyltetrahydrofuran; sulfoxides such as dimethylsulfoxide; oxolanes such as 1,3-dioxolane, 4-methyl-1,3-dioxolane; nitrogen-containing compounds such as acetonitrile, nitromethane; organic acid esters such as methyl formate, methyl acetate, ethyl acetate, butyl acetate, methyl propionate, ethyl propionate; inorganic acid esters such as triethyl phosphate; diglymes; triglymes; sulfolanes; oxazolidinones such as 3-methyl-2-oxazolidinone; sultones such as 1,3-propane sultone, 1,4-butane sultone, naphthasultone; may be mentioned, which may be used alone or in combination of two kinds or more. When an electrolyte solution is used as gel-form, nitrile-based polymer, acrylic polymer, fluorine-containing polymer, alkylene oxide polymer, etc. can be added as a gelatinizer.

As a method of producing a lithium ion secondary battery of the present invention, for example, the next production method can be mentioned. Namely, a positive electrode and a negative electrode are put together via a separator, rolled or folded in accordance with a battery shape and contained in a battery container, to which an electrolyte solution is poured and sealed. A shape of the battery may be any, such as a known coin shape, button shape, sheet shape, cylinder shape, box shape, flat shape, etc.

The present invention will be explained by following examples, but the present invention is not limited to then. In the examples and comparative examples, "part" and "%" are by weight unless otherwise mentioned.

(1) HOMO Value

The HOMO value of a polymer was determined by setting an approximate composition in a range that the total number of atoms does not exceed 200 by a computer program "MOPAC93" (made by Fujitsu Co. Ltd.)

(2) Content of Ethylene Repeating Units

The content of ethylene repeating units of a polymer was obtained by $^1$H-NMR and $^{13}$C-NMR measurement.

(3) Glass Transition Temperature (Tg)

The Tg of a polymer was measured by a differential scanning calorimeter (DSC) at a temperature elevation rate of 10° C./min.

(4) Gel Content (G1)

The gel content in a polymer was obtained as follows. First, 0.2 g of the polymer was soaked in 20 milliliters of THF at 25° C. for 72 hours and the result was filtered by a sieve of 80 mesh. Next, a product on the sieve was dried and weighed. The gel content (G1) was obtained by expressing the obtained weight by a percentage based on a weight of the polymer before soaking (0.2 g).

(5) Swelling Degree

The swelling degree of a polymer was obtained by measuring a weight of 4 cm$^2$ of a cast film obtained by casting on a polytetrafluoroethylene (PTFE) sheet a dispersion liquid wherein 0.2 g of the polymer is dispersed in 10 ml of N-methylpyrrolidone (hereinafter, referred to as NMP) and drying, soaking the result in NMP at a temperature of 60° C. for 24 hours, wiping the surface of the pulled up film with a towel paper and immediately measuring the weight, and dividing the weight after soaking by the weight before soaking.

(6) Particle Diameter

The particle diameter of a polymer was obtained by measuring a diameter of 100 polymer particles selected at random in a picture taken by a transmission electron microscope, and a calculated average value thereof was used as an average particle diameter.

(7) Bending Test

A positive electrode slurry composition was uniformly applied on aluminum foil collector having thickness of 20 μm by the doctor blade method and dried by a drier at 120° C. for 15 minutes. After furthermore drying by a vacuum drier at 0.6 kPa and 120° C. for 2 hours, the result was pressed by a twin-roll press to have an electrode density of 3.2 g/cm$^3$ so that a positive electrode was obtained.

The positive electrode was cut to be a rectangular shape of 3 cm in width×9 cm in length and bent by 180° by halfway round a stainless round bar having a diameter of 1 mm laid at the center in the longitudinal direction (at 4.5 cm), then, the state of an applied film (mixed layer) on the outside of a bent portion was observed for 10 electrode pieces. The case no crack nor falling off were caused in all 10 pieces was evaluated to be "O" and the case one or more cracks or falling off were caused on one or more piece was evaluated "X".

(8) Peel Strength

The positive electrode obtained in the same way as in (7) was cut to be a rectangular shape of 3 cm in width×9 cm in length, a tape ("sellotape" made by Nichiban Co. Ltd. regulated in JIS-Z-1522) was adhered on the surface of the positive electrode, the positive electrode was fixed, a strength (N/cm) at the time that the tape was peeled off at a speed of 50 mm/min. in the 180° direction was measured for 10 times, and an average value thereof was obtained. The larger the value, the stronger the adhesion strength, which indicates that the mixed layer is hard to be fallen off from a collector.

(9) Initial Discharge Capacity at High Temperature

Lithium metal was used as a negative electrode.

A positive electrode produced in the same way as in (7) was cut to be a circular shape having a diameter of 15 mm and arranged so as to contact the metal lithium as the negative electrode by providing a separator made by a circular polypropylene porous film having a diameter of 18 mm and a thickness of 25 μm. An expand metal was put on the metal lithium on the opposite side of the separator and contained in a coin shaped outer container made by stainless steel (diameter of 20 mm, height of 1.8 mm and thickness of the stainless steel of 0.25 mm) provided with a polypropylene packing. An electrolyte solution was injected into the container not to leave any air therein, a stainless steel cap having a thickness of 0.2 mm was covered and fixed on the outer container via the polypropylene packing, the container was sealed, so that a coin shaped battery having a diameter of 20 mm and a thickness of about 2 mm was produced. As the electrolyte solution, a solution wherein LiPF$_6$ was dissolved with a concentration of 1 mol/liter in a mixed liquid composed of ethylene carbonate/ethylmethyl carbonate=½ (volume ratio at 20° C.) was used.

By using the coin shaped battery produced in the above method, a charge/discharge cycle was repeated by a constant current rate of 0.1° C. at a temperature of 65° C. from 3V to 4.2V. An initial discharge capacity at high temperature was obtained as a discharge capacity in the third cycle. The unit is mAh/g (per an active material)

(10) Charge/Discharge Cycle Characteristic at High-Temperature

Discharge capacities in the third cycle and the fiftieth cycle were measured in the same way as in the measurement of the initial discharge capacity and the ratio of the discharge capacity in the fiftieth cycle with respect to the discharge capacity in the third cycle was calculated in percentage. It indicates that the larger the value, the less the capacity reduces.

(11) Charge/Discharge Rate Characteristic

Other than changing the measurement condition to a test temperature of 40° C. and a constant current amount to 0.1° C. and 1C, the discharge capacity in the fiftieth cycle at the respective constant current amounts was measured in the same way as in the measurement of the initial discharge capacity at high-temperature. The rate of the discharge capacity at 1C with respect to that at 0.1C in the fiftieth cycle was calculated by percentage. It indicates that the larger the value, the higher in speed the charging/discharging can be.

(12) Cyclic Voltammetry (CV value)

CV value was measured by using three-electrode type beaker cell.

A counter electrode was produced by cutting a lithium foil to a size of 3 cm×1.5 cm, rolling the lithium foil to what obtained by welding a stainless steel (SUS) wire to a nickel mesh, then, adhering a PTFE seal tape to the SUS wire so that the SUS wire does not contact the electrolyte solution. A reference electrode was produced by using a square lithium foil of 1 cm×1 cm and in the same way as in the counter electrode.

A working electrode was obtained by mixing 10 g of the polymer A, 20 g of the polymer B and 70 g of a conductive carbon with the liquid medium C, uniformly applying a dispersion liquid wherein the concentration was finally adjusted by NMP to an aluminum foil (thickness of 20 μm) by the doctor blade method, drying by a drier at 120° C. for 40 minutes, furthermore drying under a reduced pressure of 0.6 kPa by a vacuum drier at 120° C. for two hours, and compressing by twin-roll press. The electrode was cut to a square of 0.5 cm×0.5 cm, then, a SUS wire and an aluminum foil portion of the electrode were welded, vacuum dried at 120° C. for two hours, and a PTFE seal tape was adhered to the SUS wire so that the SUS wire does not contact the electrolyte solution. As the electrolyte solution, a solution wherein LiPF$_6$ was dissolved at a concentration of 1 mol/liter in a mixture liquid wherein ethylene carbonate (EC):ethylmethyl carbonate (EMC)=1:2 (the volume ratio at 20° C.). Assembling and measuring of the measurement cell were carried out in a vacuum globe box. Data was obtained by reading a current value in the second cycle at 4.6V. The unit is µA/cm². The larger the current value, the poorer the oxidization resistance.

EXAMPLE 1

A uniform slurry composition for a positive electrode was obtained by mixing 0.7 part based on a solid content of a solution obtained by dissolving hydrogenation product of acrylonitrile-butadiene rubber, wherein the composition of the polymer is 78 mol % of a content of ethylene units, 22 mol % of a content of acrylonitrile units and the iodine value of 4 (HOMO value: −11.2 eV, Tg: −21° C., G1: 0%) in NMP, 1.3 parts based on a solid content of a dispersion liquid wherein acrylic rubber (a copolymer obtained by emulsion polymerization on the 86 parts of 2-ethylhexyl acrylate, 4 parts of methacrylic acid, 9 parts of acrylonitrile and 1 part of diethylene glycol dimethacrylate, the HOMO value: −11.4 eV, Tg: −48° C., G1: 84%, swelling degree: 1.5 times, average particle diameter: 0.15 µm) was dispersed in NMP, 100 parts of lithium cobaltate as an active material and 5parts of Denka acetylene black (HS-100produced by DENKI KAGAKU KOGYU KK.) as a conductivity adding agent, adding more NMP so that a solid content becomes 73% and mixing the result. By using the slurry, a positive electrode was produced. The result of investigating a binding property of the electrode, battery characteristic and a CV value are shown in Table 1.

EXAMPLE 2

Except for using ethylene-methyl acrylate copolymer having a content of ethylene units of 40 mol % (the HOMO value: −11.2 eV, Tg: −31.5° C., G1: 0%) instead of hydrogenation product of acrylonitrile-butadiene rubber in the example 1, all was conducted in the same way as in the example 1. The result of investigating a binding property of the electrode, battery characteristic and a CV value are shown in Table 1.

EXAMPLE 3

Except for using a copolymer including 25 parts of acrylonitrile, 74 parts of butylacrylate and 1 part of diethylene glycol dimethacrylate (the HOMO value: −11.3 eV, Tg: −28° C., G1: 89%, the swelling degree: 2.1 times, an average particle diameter: 0.19 µm) instead of acrylic rubber in the example 1, all was conducted in the same way as in the example 1. The result of investigating a bonding property of the electrode, battery characteristics and a CV value are shown in Table 1.

EXAMPLE 4

Except for using a copolymer including 48 parts of methyl methacrylate, 50 parts of 2-ethylhexyl acrylate, 1 part of methacrylic acid and 1 part of ethylene glycol dimethacrylate (the HOMO value: −11.0 eV, Tg: −20° C., G1: 86%, the swelling degree: 1.9 times, an average particle diameter: 0.17 µm) instead of acrylic rubber in the example 1, all was conducted in the same way as in the example 1. The result of investigating a bonding property of the electrode, battery characteristics and a CV value are shown in Table 1.

COMPARATIVE EXAMPLE 1

Except for using an 2-ethylhexyl acrylate-acrylonitrile copolymer (a copolymer obtained by emulsion polymerization on 40 parts of 2-ethylhexyl acrylate and 60 parts of acrylonitrile, the HOMO value: −11.7 eV, Tg: −3° C., no ethylene repeating unit) instead of hydrogenation product of acrylonitrile-butadiene rubber in the example 1, all was conducted in the same way as in the example 1. The result of investigating a bonding property of the electrode, battery characteristics and a CV value are shown in Table 1.

COMPARATIVE EXAMPLE 2

Except for using a stylene-butadiene copolymer (a copolymer obtained by performing solution polymerization on 50 parts of stylene and 50 parts of butadiene in toluene, the HOMO value: −9.5 eV, Tg: −15° C., no ethylene repeating unit) instead of hydrogenation product of acrylonitrile-butadiene rubber in the example 1, all was conducted in the same way as in the example 1. The result of investigating a bonding property of the electrode, battery characteristics and a CV value are shown in Table 1.

TABLE 1

| | | Example | | | | Comparative Example | |
|---|---|---|---|---|---|---|---|
| | | 1 | 2 | 3 | 4 | 1 | 2 |
| Binding Property | Binding Test | ◯ | ◯ | ◯ | ◯ | X | X |
| | Peel Strength (N/cm) | 0.25 | 0.28 | 0.33 | 0.26 | 0.20 | 0.18 |
| Battery Characteristics | Initial Discharge Capacity at High-Temperature (mAh/g) | 145 | 148 | 145 | 146 | 125 | 128 |
| | Charge/Discharge Cycle Characteristic at High-Temperature (%) | 64 | 61 | 67 | 62 | 35 | 35 |
| | Charge/Discharge Rate Characteristics (%) | 46 | 42 | 45 | 41 | 25 | 21 |
| | CV value (µA/cm²) | 70 | 44 | 67 | 62 | 88 | 720 |

As shown in Table 1, the positive electrode produced by using a slurry composition for a positive electrode for a lithium ion secondary battery of the present invention exhibited preferable results in the folding test, great pealing strength and good binding property. Also, a lithium ion secondary battery having the positive electrode had a large discharging capacity, a good cycle characteristic, an excellent rate characteristic and a preferably low CV value even under a high temperature condition (Examples 1 to 4).

On the other hand, when using an 2-ethylhexyl acrylate-acrylonitorile copolymer not having ethylene repeating units (comparative Example 1) and when using a stylene-butadiene copolymer having a HOMO value between −9 eV and −10 eV not having ethylene repeating units (comparative Example 2) instead of the polymer A, the binding property was poor, and in batteries having these electrodes, the discharging capacity declined by a little more than 10%, and the cycle characteristic and the rate characteristic dropped sharply to about a half under a high temperature condition. The CV value in the former case showed only a little increased oxidizability, while the latter exhibited to become considerably easily oxidized by 10 times or more.

The invention claimed is:

1. A slurry composition for a positive electrode for a lithium ion secondary battery, comprising:
    a polymer A wherein a HOMO (Highest Occupied Molecular Orbital Energy) value by a semiempirical method molecular orbital calculation is −13.5 eV to −10 eV, a glass transition temperature is −80° C. to 0° C. and a content of ethylene repeating units is 35 mol % to 90 mol %;
    a polymer B wherein a HOMO value by a semiempirical method molecular orbital calculation is −13.5 eV to −10 eV, a glass transition temperature is −80° C. to 0° C., and a gel content is 50 wt % or more;
    an active material for a positive electrode;
    a conductivity adding agent; and
    a liquid medium C in which the polymer A dissolves but the polymer B does not dissolve.

2. The slurry composition for a positive electrode for a lithium ion secondary battery as set forth in claim 1, wherein the polymer A is a copolymer of a mixed monomer including a monomer, by which a glass transition temperature of its homopolymer becomes 0° C. or less, by a substantial ratio.

3. The slurry composition for a positive electrode for a lithium ion secondary battery as set forth in claim 1, wherein the polymer A is at least one kind selected from a hydrogenation product of acrylonitrile-butadiene rubber, and an ethylene-methyl acrylate copolymer.

4. The slurry composition for a positive electrode for a lithium ion secondary battery as set forth in claim 3, wherein the polymer A is the hydrogenation product of acrylonitrile-butadiene rubber.

5. The slurry composition for a positive electrode for a lithium ion secondary battery as set forth in claim 4, wherein an iodine value of the polymer A is 15 cgI$_2$/g or less.

6. The slurry composition for a positive electrode for a lithium ion secondary battery as set forth in claim 1, wherein a swelling degree of the polymer B by the liquid medium C is not more than 30 times.

7. The slurry composition for a positive electrode for a lithium ion secondary battery as set forth in claim 1, wherein the polymer B is a cross-linked polymer obtained by polymerizing a monomer mixture including multifunctional ethylenically unsaturated monomer.

8. The slurry composition for a positive electrode for a lithium ion secondary battery as set forth in claim 1, wherein a particle diameter of the polymer B is 0.005 μm to 1000 μm.

9. The slurry composition for a positive electrode for a lithium ion secondary battery as set forth in claim 1, wherein an amount ratio of the polymer A and the polymer B is 1/10 to 10/1 by the weight ratio of A/B.

10. The slurry composition for a positive electrode for a lithium ion secondary battery as set forth in claim 1, wherein a boiling point of the liquid medium C under an atmospheric pressure is not lower than 80° C. and not higher than 350° C.

11. The slurry composition for a positive electrode for a lithium ion secondary battery as set forth in claim 1, wherein the active material for the positive electrode is selected from the group consisting of TiS$_2$, TiS$_3$, amorphous MoS$_3$, transition metal oxides and lithium containing composite metal oxides.

12. A positive electrode for a lithium ion secondary battery wherein a mixed layer is bound to a collector, wherein said mixed layer comprises
    a polymer A wherein a HOMO (Highest Occupied Molecular Orbital Energy) value by a semiempirical method molecular orbital calculation is −13.5 eV to −10 eV, a glass transition temperature is −80° C. to 0° C. and a content of ethylene repeating units is 35 mol % to 90 mol %;
    a polymer B wherein a HOMO value by a semiempirical method molecular orbital calculation is −13.5 eV to −10 eV, a glass transition temperature is −80° C. to 0° C., and a gel content is 50 wt % or more;
    an active material for a positive electrode; and
    a conductivity adding agent.

13. The positive electrode for a lithium ion secondary battery as set forth in claim 12, wherein the active material for the positive electrode is selected from the group consisting of TiS$_2$, TiS$_3$, amorphous MoS$_3$, transition metal oxides and lithium containing composite metal oxides.

14. The positive electrode for a lithium ion secondary battery as set forth in claim 12, wherein the polymer A is at least one kind selected from a hydrogenation product of acrylonitrile-butadiene rubber and an ethylene-methyl acrylate copolymer.

15. A lithium ion secondary battery having a positive electrode wherein a mixed layer is bound to a collector, wherein said mixed layer comprises
    a polymer A wherein a HOMO (Highest Occupied Molecular Orbital Energy) value by a semiempirical method molecular orbital calculation is −13.5 eV to −10 eV, a glass transition temperature is −80° C. to 0° C. and a content of ethylene repeating units is 35 mol % to 90 mol %;
    a polymer B wherein a HOMO value by a semiempirical method molecular orbital calculation is −13.5 eV to −10 eV, a glass transition temperature is −80° C. to 0° C., and a gel content is 50 wt % or more;
    an active material for a positive electrode; and
    a conductivity adding agent.

16. The lithium ion secondary battery as set forth in claim 15, wherein the active material for the positive electrode is selected from the group consisting of TiS$_2$, TiS$_3$, amorphous MoS$_3$, transition metal oxides and lithium containing composite metal oxides.

17. The lithium ion secondary battery as set forth in claim 15, wherein the polymer A is at least one kind selected from a hydrogenation product of acrylonitrile-butadiene rubber and an ethylene-methyl acrylate copolymer.

* * * * *